(12) United States Patent
Gayde et al.

(10) Patent No.: US 7,444,131 B2
(45) Date of Patent: Oct. 28, 2008

(54) METHOD AND APPARATUS FOR REROUTING TERMINATIONS FOR CALEA TARGETS THROUGH A PREDETERMINED SURVEILLING MSC

(75) Inventors: Ruth Schaefer Gayde, Naperville, IL (US); Douglas Harvey Riley, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 454 days.

(21) Appl. No.: 11/343,641

(22) Filed: Jan. 31, 2006

(65) Prior Publication Data

US 2007/0178894 A1    Aug. 2, 2007

(51) Int. Cl.
*H04Q 7/20* (2006.01)

(52) U.S. Cl. ............... 455/404.2; 455/445; 455/414.1; 455/404.1

(58) Field of Classification Search ............... 455/404.1, 455/404.2, 410, 411, 414.1, 414.2, 432.1, 455/432.3, 433, 434, 435.1, 456.1, 456.2, 455/456.3; 726/13, 14, 22, 26, 27, 28, 30; 709/224, 236, 230, 206; 379/7, 32.01, 35, 379/213.01, 88.03
See application file for complete search history.

(56) References Cited

U.S. PATENT DOCUMENTS

| | | | | |
|---|---|---|---|---|
| 5,428,667 | A * | 6/1995 | Easterling et al. ........... 455/410 |
| 5,937,345 | A * | 8/1999 | McGowan et al. ........... 455/410 |
| 6,424,701 | B1 * | 7/2002 | Maillet et al. ................ 379/35 |
| 6,504,907 | B1 * | 1/2003 | Farris et al. .................. 379/35 |
| 6,577,865 | B2 * | 6/2003 | Dikmen et al. .............. 455/433 |
| 6,650,633 | B1 * | 11/2003 | Albers et al. ................ 370/352 |
| 6,654,589 | B1 * | 11/2003 | Haumont .................. 455/67.11 |
| 6,925,082 | B2 | 8/2005 | Buhrke et al. |
| 6,947,525 | B2 | 9/2005 | Benco |
| 6,963,739 | B2 * | 11/2005 | Dorenbosch et al. ........ 455/406 |
| 7,231,218 | B2 * | 6/2007 | Diacakis et al. .......... 455/456.1 |
| 7,302,702 | B2 * | 11/2007 | Hippelainen ................ 726/13 |
| 7,383,582 | B1 * | 6/2008 | Francis ........................ 726/26 |
| 2001/0052081 | A1 * | 12/2001 | McKibben et al. .......... 713/201 |
| 2002/0051518 | A1 * | 5/2002 | Bondy et al. ................. 379/35 |
| 2005/0094773 | A1 | 5/2005 | Peterson |

* cited by examiner

*Primary Examiner*—Jean A Gelin

(57) ABSTRACT

A system and method is provided for surveilling call terminations to a roaming mobile in a wireless telecommunications network in which Location Request Queries (LRQs) for the target mobile can be sent from any MSC in the network. The system and method include forcing the path of the target mobile's call terminations through a predetermined Target Intercept Access Point (TIAP) for surveillance while meeting CALEA constraints including the requirement that information about surveillance may not be shared over public interfaces.

18 Claims, 5 Drawing Sheets

US 7,444,131 B2

METHOD AND APPARATUS FOR REROUTING TERMINATIONS FOR CALEA TARGETS THROUGH A PREDETERMINED SURVEILLING MSC

BACKGROUND OF THE INVENTION

This invention relates to a method and apparatus for shriveling call terminations to a surveillance target's mobile and more particularly to forcing the call path for these terminations through a predetermined MSC for surveillance.

While the invention is particularly directed to the art of ANSI-41 and MAP wireless telecommunications networks, and will be thus described with specific reference thereto, it will be appreciated that the invention may have usefulness in other fields and applications.

As is known in the art, the Communications Assistance for Law Enforcement Act (CALEA) prescribes the statutory obligations of a telecommunications carrier to assist a Law Enforcement Agency (LEA) in executing electronic surveillance pursuant to a court order or other lawful authorization. Under CALEA, the telecommunications carrier is generally obliged to provide a suitable means for LEAs to monitor the calls of telephone subscribers when the LEAs are duly authorized under the law to engage in such surveillance of the subscribers. CALEA simply seeks to ensure that after an LEA obtains the appropriate legal authority, the telecommunications carrier will have appropriate capability, and sufficient capacity, to assist the LEA regardless of their specific systems or services. Accordingly, various implementations have been developed to enable telecommunications carriers accommodate CALEA.

Until recently, a called party's "home" destination network node has typically always been involved in calls made to the calling party in ANSI-41 wireless telecommunications networks in the United States. The "home" destination network node, referred to herein as the home network node, can be either a home MSC or similar switching apparatus for wireless originated calls, or a local gateway switch for wire line originated calls.

The home network node would send a Location Request Query such as a Location Request Invoke message to the HLR and then route the call to the appropriate serving MSC, regardless of its location, using a Temporary Local Directory Number received in the Location Request Return Result.

For example, a call from a Miami based origination to a mobile having a home network node (an MSC) in New York that is currently roaming in Seattle will first be routed to the mobile's home network node in New York and then delivered to the serving Seattle MSC, instead of having initially been routed directly from Miami to Seattle. Even more illuminating would be a call from that same Miami based originator to that same New York customer actually sitting next to that Miami originator. Again, the call will first be routed to New York and then back to Miami.

Consequently, today's CALEA methods, at least as they apply to mobile terminations, that is calls made to a mobile phone, are based upon this assumption that the call, whether it is a wire line originated call or a wireless originated call, will first be routed to the home network node before any attempts will be made to determine the actual serving location and treatment for that called mobile. Thus LEAs have typically arranged CALEA surveillances at the target's home network node since wherever the target may be roaming with their mobile, they can be locally shriveled at their home network node, such as New York in this example.

However, in an effort to alleviate the unnecessary utilization of network resources, some networks allow subscribers to have their call deliveries initiated from any MSC in the network, not just from the subscriber's home MSC. That is, for a given subscriber, a Location Request Invoke could be sent to the HLR from any MSC. In ANSI-41 networks, this can be referred to as being LOCREQ'ed from any MSC. For the Miami call examples above, the Location Request Invoke would be sent from Miami, not from the New York home network node, and the Location Request Return Result would cause the call to be routed directly to Seattle, or as a local mobile-to-mobile call at the Miami MSC, respectively, completely eliminating any signaling to the New York network node.

While these changes to the signaling path may improve efficiency, they pose problems for LEAs intending to survey a target's mobile. Unless the LEAs have placed surveillances for this mobile at all MSCs in the network, terminating call data and content will be unavailable to them if the target is LOCREQ'ed from an MSC that does not have a surveillance set-up for the target mobile.

Local law enforcement agencies, for example the New York Police Department, may have limited jurisdiction, and may not be able to easily place a surveillance at, for example a Miami MSC. Further, it may be significantly cheaper and easier for some LEAs to be able to choose a specific MSC for all or most surveillances of call terminations, thereby saving on deploying surveillance links and hardware at multiple MSCs.

Therefore, a method and apparatus are needed to solve the problem of providing terminating surveillance information from a single fixed MSC, while still meeting the constraints of CALEA which require that information about surveillance may not be shared over public interfaces such as ANSI-41.

The present invention contemplates a new and improved system and method for shriveling mobile terminated calls that resolves the above-referenced difficulties and others.

SUMMARY OF THE INVENTION

A method and apparatus (system) is provided for shriveling call terminations to a roaming mobile in a wireless telecommunications network in which Location Request Queries (LRQs) for the target mobile can be sent from any MSC in the network. The system and method include forcing the path of the target mobile's call terminations through a predetermined Target Intercept Access Point (TIAP) for surveillance while meeting CALEA constraints including the requirement that information about surveillance may not be shared over public interfaces.

In one aspect of the invention, the method includes provisioning the target mobile Home Location Register (HLR) with a TIAP identifier uniquely identifying the TIAP, determining that an LRQ sent by a Location Requesting MSC (LRMSC) to the target mobile's HLR does not come from the TIAP, determining that the target mobile is not registered at the TIAP, determining that an LRQ sent from the TIAP is for a surveillance target mobile, determining that the LRQ sent from the TIAP is coming from an MSC that is a non-serving TIAP for the target; and forcing call terminations for the roaming surveillance target mobile through TIAP for surveillance.

In another aspect of the invention the system includes an LRMSC sending a LRQ for obtaining routing information for the mobile call termination to the target's mobile, a TIAP Mobile Switching Center for allocating a TRRN and noting that the TRRN is being used for surveillance of the target mobile, and an HLR for the target mobile provisioned with a TIAP Identifier uniquely identifying the TIAP in the network and surveillance information identifying the target mobile as a surveillance target, the HLR determining that a LRQ sent from the LRMSC is not from the TIAP and determining that a LRQ sent from the TIAP is for a surveillance target mobile sent from a non-serving TIAP for the target mobile.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed but in the claims, and illustrated in the accompanying drawings in which:

DETAILED DESCRIPTION OF THE PREFERRED EMBODIMENTS

Figure 1:
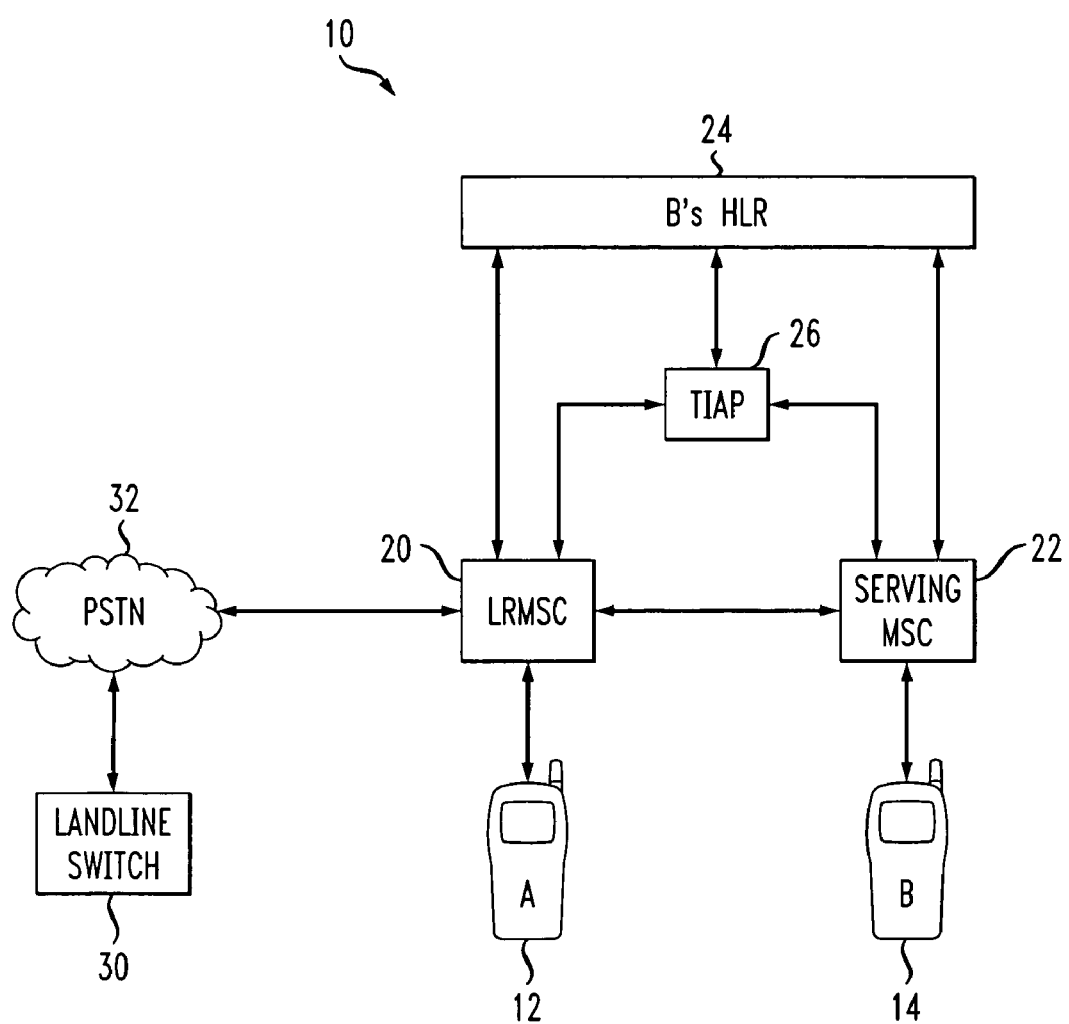
FIG. 1 is a block diagram illustrating a system shriveling call terminations to a surveillance target's mobile.

Referring now to the drawings wherein the showings are for purposes of illustrating the preferred embodiments of the invention only and not for purposes of limiting same. In FIG. 1, a system for directing mobile call terminations to a predetermined MSC for surveillance is shown generally at 10. The system 10 is part of one or more wireless telecommunications networks which can be networks using ANSI-41 protocols, such as CDMA or TDMA networks, or networks using Mobile Application Part (MAP) protocols, such as Global System for Mobile Communications (GSM) networks or Universal Mobile Telephone System (UMTS) networks, among others.

In the system 10 as well as the examples provided herein, a calling party A uses a mobile 12, also known as a mobile terminal or cellular phone, among others, to call the mobile 14 of a called party B. In reference to B, and B's mobile 14, the call can be considered a termination, since mobile 12 is calling mobile 14. A Location Requesting Mobile Switching Center (LRMSC) 20 is connected to A's mobile 12 for routing the call to the Mobile Switching Center (MSC) serving B's mobile 22, referred to as the Serving MSC 22 for delivery to B's mobile. The Serving MSC 22 is also known, as a visited MSC, since B is roaming. The LRMSC 20 is often the MSC serving A's mobile 12, which sends out a Location Request Query during call setup for call terminations to a mobile, B's mobile 14 in the examples provided here.

Although the call originates in the LRMSC 20 as shown, it should be appreciated that the system and method described herein can also apply to calls arriving at the LRMSC 20 over a trunk from another switch, such as for example a landline switch 30 via the Public Switched Telephone Network (PSTN) 32.

The system 10 also includes B's Home Location Register 24 responsible for storing location information needed for routing calls to B as well as storing wireless service information for B and other information, some of which is described in further detail below.

The system 10 also includes a Shriveling MSC, referred to herein as the Target Intercept Access Point (TIAP) 26. The TIAP 26 is an MSC predetermined by the LEA for use in shriveling B, referred to herein as the target, by shriveling call terminations to B's mobile 14. The system and method described herein allow the LEA to select a shriveling MSC for call terminations by dynamically forcing the path of all call terminations through this predetermined shriveling MSC, regardless of the network architecture (or technology) for location queries. This ensures the involvement of a specific MSC for all call terminations to the mobile 14, regardless of the mobile's registration status and the call delivery architecture in the network, forcing the call to be delivered through a specific surveillance point, the TIAP 26.

Figure 2:
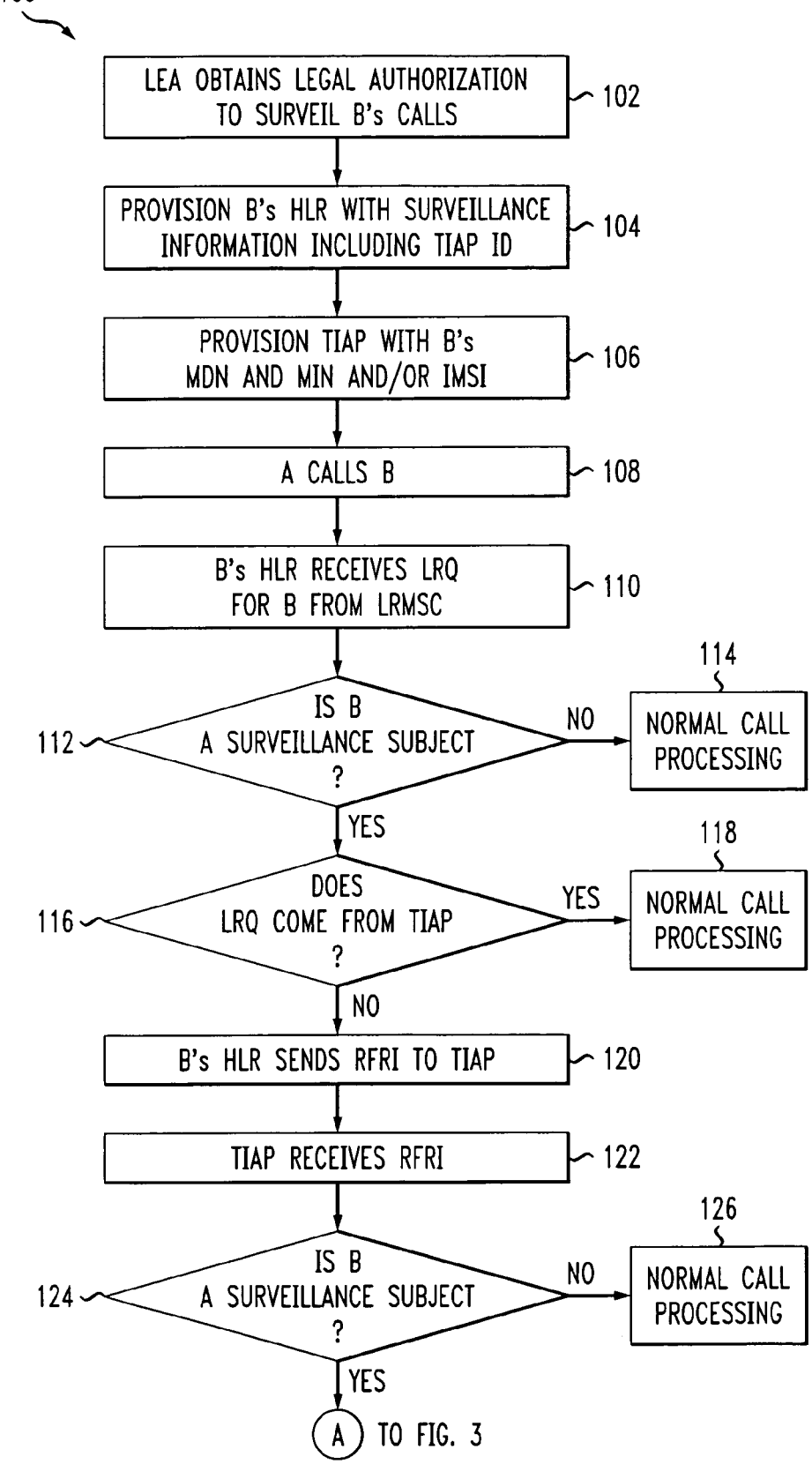
FIG. 2 is a flow chart illustrating portions of a method for shriveling call terminations to a surveillance target's mobile.
Figure 3:
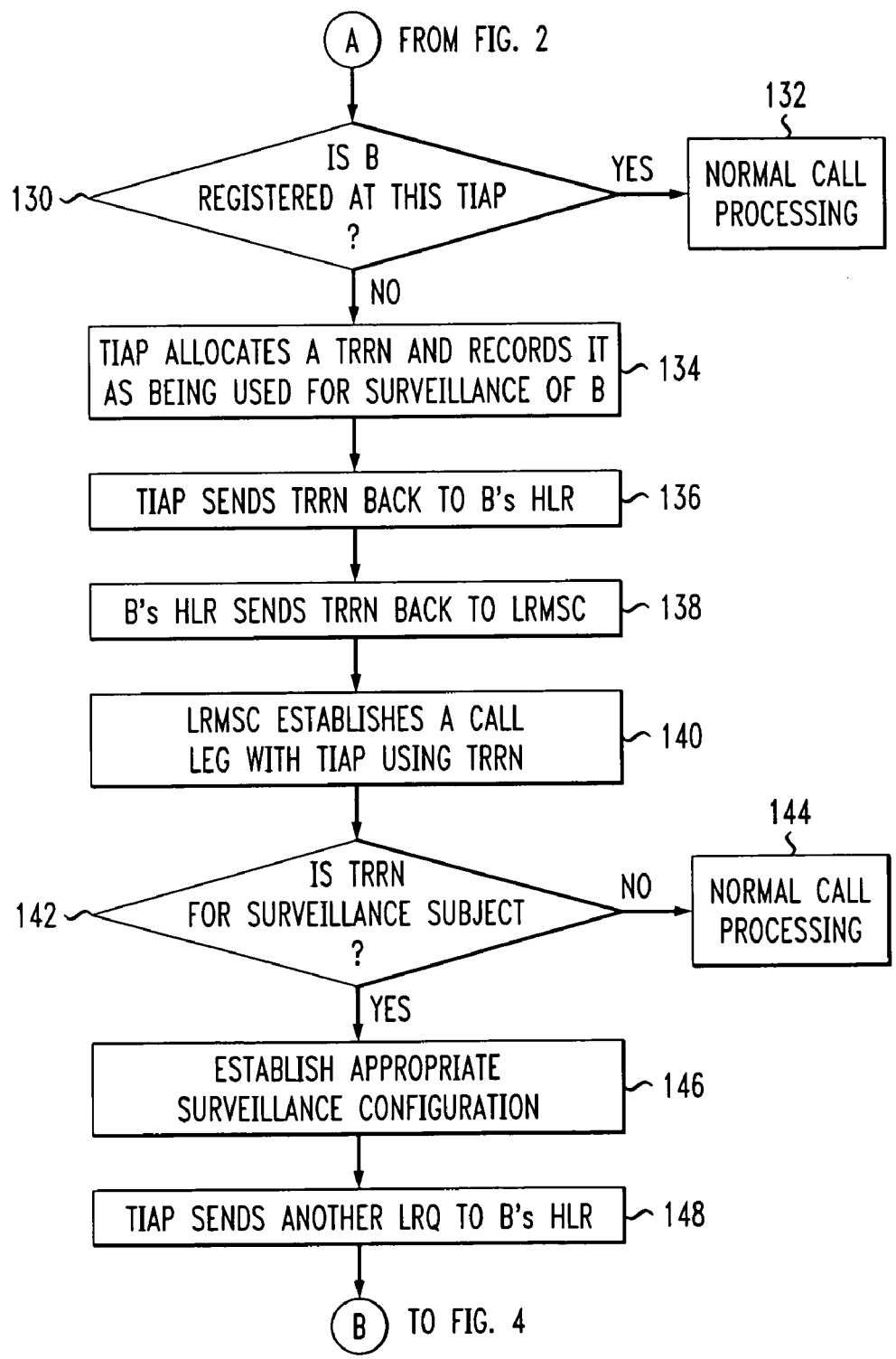
FIG. 3 is a flow chart illustrating portions of a method for shriveling call terminations to a surveillance target's mobile.
Figure 4:
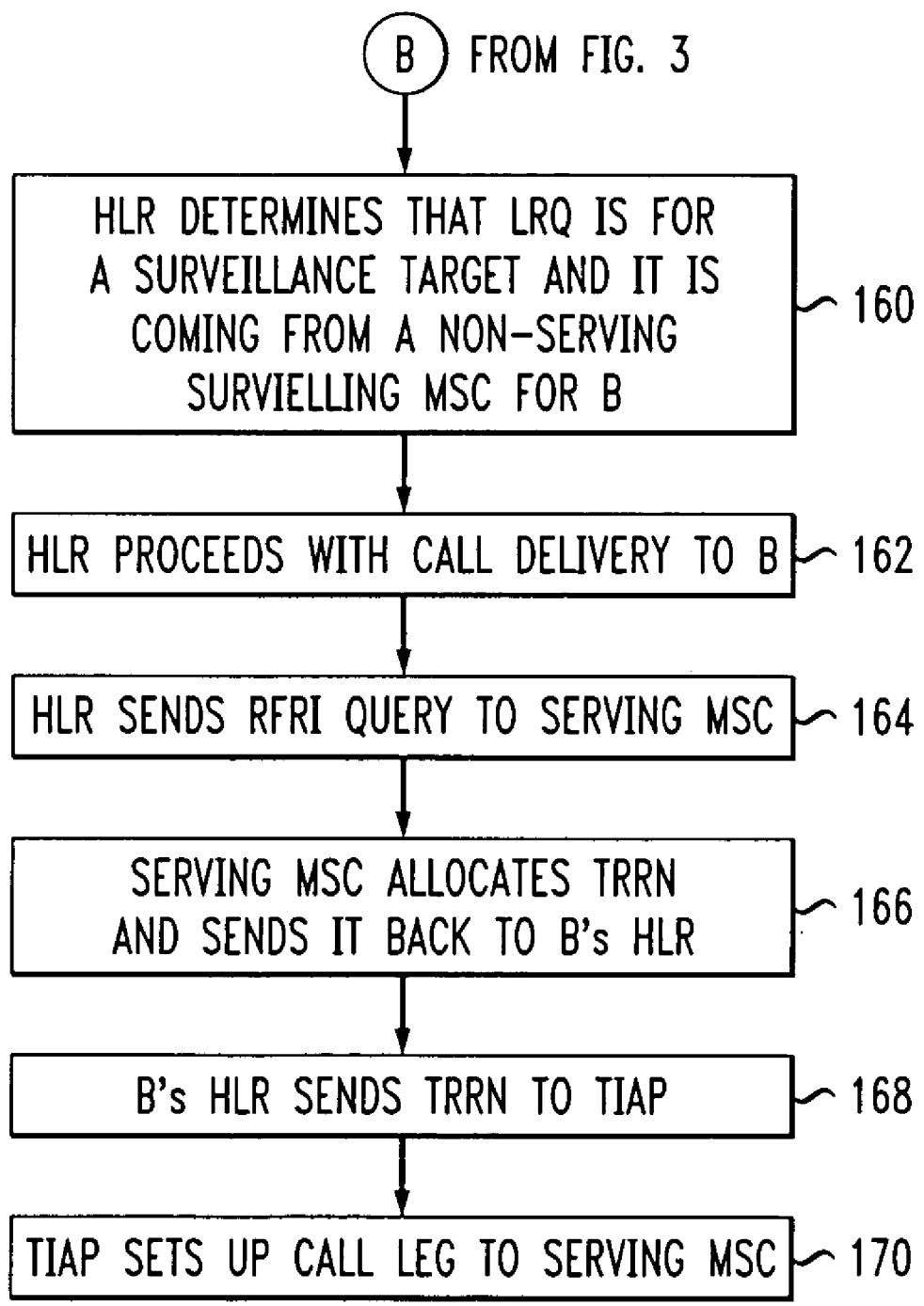
FIG. 4 is a flow chart illustrating portions of a method for shriveling call terminations to a surveillance target's mobile.

Referring now to FIGS. 2-4, the method of operation of the system 10 is shown generally at 100. In the examples provided herein, a calling party A calls a called party B in a mobile phone 12 to mobile phone 14 call. Person B is the target of a CALEA surveillance operation, referred to generally as being shriveled. As part of this procedure, the LEA obtains the proper legal authorization to conduct the surveillance at 102 as required by law, such as obtaining a court order.

Next, B's HLR 24 is provisioned with surveillance information, also referred to as CALEA information, in a manner which meets the constraints of CALEA. One example of these constraints includes the requirement that information about surveillance may not be shared over public interfaces, such as ANSI-41 transmissions. The surveillance information may be provisioned in the HLR in a secure fashion by the service provider, in conjunction with the LEA.

The surveillance information provisioned at B's HLR 24 includes identifying information for B's mobile 14 including the Mobile Identity Number (MIN) and/or International Mobile Station Identifier, or similar identifiers, and the Mobile Directory Number (MDN) or similar identifiers. The shriveling information also associates these identifiers with a surveillance operation so that B's HLR 24 can determine that call terminations made to B's mobile 14 should be shriveled as described in further detail below.

The surveillance information provisioned at the HLR 24 at 104 also includes an identifier, referred to generally herein as the TIAP identifier, uniquely identifying a specific predetermined MSC which becomes the TIAP 26. The TIAP identifier is then associated with B at the HLR 24. In this example, this can be done by associating the MSC identifier of the TIAP, such as the MSC ID sent in some ANSI-41 messages, with the subscriber data of the shriveled target. The MSC ID in the HLR will map to a particular SS7 point code, which defines the SS7 address.

The TIAP 26 is also provisioned with surveillance information about target B's mobile 14 in a manner which meets the constraints of CALEA, such as those stated above. The information includes the MIN and/or IMSI for the mobile 14, and optionally, the mobile's MDN. Caller A calls B's mobile 14 at 108. B's HLR receives a Location Request Query (LRQ) that is sent from the LRMSC 20 at 110 which identifies B's mobile 14 for the call termination or destination point.

This LRQ is part of the call setup procedure which occurs when setting up a call terminating at a mobile in a wireless network in which the LRMSC is requesting location information for B's terminal that it needs for routing the call thereto. The LRQ can be a location request query sent in any suitable known protocol including but not limited to an ANSI-41 LOCREQ or GSM SendRoutingInformation (SRI), among others.

The HLR 24 determines that B is a Surveillance target at 112 using the surveillance information identifying B's mobile 14 as a surveillance target provisioned at 104. If the HLR determines that B is not a surveillance target at 112, normal call processing occurs at 114. If the HLR determines that B is a surveillance target at 112, the HLR determines whether the LRQ comes from B's shriveling MSC, the TIAP 26, at 116 using the MSC identifier included in the LRQ. The HLR determines that the MSC identifier is not the TIAP identifier at 116 and therefore the LRQ does not come from B's shriveling MSC.

The HLR 24 sends a Request For Routing Information (RFRI) to the TIAP 26 at 120 which the TIAP receives at 122. The RFRI can be transmitted using any suitable protocol, such as for example a ROUTREQ in ANSI-41, or similar messages using other known protocols. The RFRI includes B's MIN or other identifying information identifying B's mobile 14.

The TIAP 26 determines whether B (B's mobile 14) is a surveillance target at 124 using the surveillance information provisioned at the TIAP at 106. If it is determined that B is not a surveillance target at 124, then normal call processing occurs at 126. If the TIAP determines that B is a surveillance target at 124, the TIAP determines if B is registered with the TIAP at 130 and if not, the TIAP allocates a Temporary Roaming Routing Number (TRRN) at 134. The TRRN can be a Temporary Local Directory Number for ANSI-41 networks, a Mobile Station Roaming Number (MSRN) for GSM/UMTS networks, or other similar temporary identifier. This TRRN is allocated from an ordinary pool of such identifiers so as to be indistinguishable from non-shriveled calls thereby meeting CALEA's constraints as mentioned above. The TRRN is temporary in that it is used for identifying B's exchange only for the current call. Further, TIAP 26 notes that this TRRN is being used for the surveillance of B's mobile 14 at 134 by recording this information for future retrieval and use. For example, TIAP MSC 26 can write an entry to a dynamic data store of temporary TRRN-to-MIN associations. This information is not sent to other network nodes via any public interfaces which also meets CALEA's constraints.

The TIAP 26 sends the TRRN back to B's HLR 24 at 136 and B's HLR sends it back to the LRMSC at 138. This can be accomplished by including the TRRN in a return response answering the LRQ sent out by the LRMSC 20 as described above. This response can be sent using the applicable protocol, such as described in further detail in the example provided below.

The LRMSC 20 establishes a call leg to the TIAP at 140. This can be accomplished by sending the called party number set to the TIAP using the TRRN, such as by using an ISUP Initial Address Message (IAM) or other suitable messaging in the applicable protocol.

The TIAP receives the IAM, or other suitable message, and determines if the TRRN is for a surveillance target at 142 using the surveillance information recorded at the TIAP in step 134. If not, normal call processing occurs at 144. If the TRRN is recorded in the TIAP as indicating that it is for a surveillance target, the appropriate surveillance configuration is established at 146 for shriveling the call. This may include setting up further call legs as well as other interactions needed for shriveling the call which are known in the art.

After the surveillance is engaged, the TIAP 26 sends another LRQ to B's HLR 20 at 148. Receiving the LRQ this time, the HLR 20 at 160 determines that the LRQ is for a surveillance target but it is coming from a non-serving, shriveling MSC for B, and therefore the HLR proceeds with conventional call processing for call delivery to B, which may include some known CALEA interactions. The HLR sends a RFRI to the serving MSC 22, where B's mobile is registered, at 162. The serving MSC 22 allocates a TRRN at 164 and sends it back to B's HLR at 166. B's HLR sends the TRRN to the TIAP 26 at 168 and the TIAP sends the ISUP IAM message setting up the call leg to the serving MSC at 170

Figure 5:
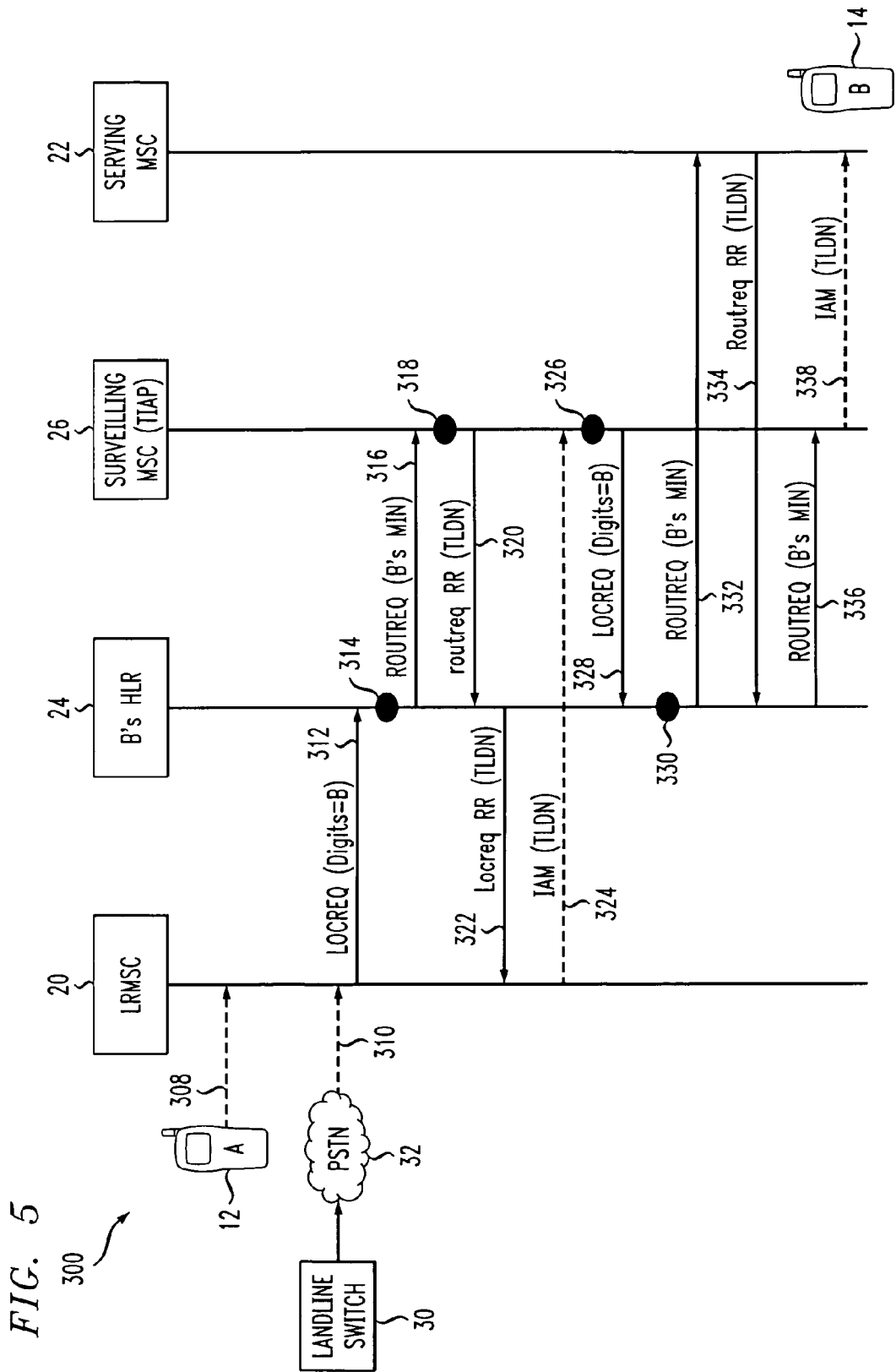
FIG. 5 is a call flow diagram illustrating an example of the messages sent by the invention using ANSI-41 protocols.

Referring now to FIG. 5, an example call flow diagram illustrating the operation of the system 10 and method 100 for rerouting call terminations through a predetermined TIAP 26 for shriveling CALEA targets in an ANSI-41 network is shown generally at 300. The called party B is again the target of a surveillance operation. B's HLR has been provisioned with surveillance information including a unique TIAP ID as described in step 104. Further, the TIAP has been provisioned with information identifying B's mobile 14 as being a surveillance target as described in step 106 above.

In this example, as in the general method of operation 100 described above, a calling party A uses a mobile 12 to call the mobile 14 of a called party B as shown at 308. A's mobile 12 is registered in the LRMSC 20, which can be referred to as the "LOCREQ'ing MSC" in ANSI-41 networks. Though the call originates in the switch 20 as shown, it should be appreciated that the call could arrive at the LRMSC MSC 20 over a trunk from another switch, such as for example a landline switch 30, via the PSTN 32.

The LRMSC sends a LRQ in the form of an ANSI-41 Location Request Invoke message (LOCREQ) to B's HLR 24 at 312. The LOCRREQ identifies B's mobile 14 for the call termination or destination point in a known manner.

The HLR 24 receives the LOCREQ, and using the CALEA surveillance information provisioned in step 104 above, recognizes that B is a CALEA target. The CALEA information about B at the HLR 24 includes the identifier of the specific MSC, the TIAP 26, to be used for shriveling call terminations to B's mobile as described above. The HLR 24 determines that the LOCREQ comes from a different MSC, one that is not the same as B's Shriveling MSC as described at 116 above.

The HLR sends a RFRI in the form of a Routing Request Invoke (ROUTREQ) to B's Shriveling MSC, the TIAP 26, at 316. This ROUTREQ looks like any other ROUTREQ that would be sent for an ordinary mobile, that is one that is not being shriveled.

The TIAP 26 receives the ROUTREQ at 318, and determines that while B is not registered there, B is a CALEA target as described in steps 122 and 130 above. As a result, the TIAP 26 allocates a TRRN in the form a of an ANSI-41 Temporary Local Directory Number (TLDN) from its ordinary TLDN pool for this call, and records in some temporary storage field that this TLDN is currently going to be used for CALEA surveillance for B as described in step 134 above. Note that if the TIAP 26 is also the Serving MSC, as determined by the fact that B is registered there, normal ROUTREQ processing-takes place as described above.

The TIAP 26 sends a Routing Request return result (router rr) to B's HLR 26 containing the TLDN for this call at 320. This router rr looks like any other ordinary router rr. The HLR 24 passes the TLDN received from the TIAP 26 back to the LRMSC 20 in the lucre rr at 322. This lucre rr also looks like any other ordinary lucre rr and is indistinguishable from lucre rr messages for non-shriveled mobiles. Thus, the router rr messages of 320 and 322 meet the CALEA constraints as described above. The LRMSC 20 sends an ISUP Initial Address Message (IAM) with the Called Party Number set to the TLDN at 324 thereby setting up a call leg to the TIAP 26. To the LRMSC 20, this appears to be an ordinary call delivery.

The TIAP 26 receives the IAM for the TLDN at 326, determines that the TLDN is for a CALEA target using the CALEA information recorded at step 134 above. The TIAP 26 then establishes the appropriate surveillance configuration which can include establishing one or more call legs in a conventional manner. Of course, if the TLDN is not recorded as a surveillance target, the normal call processing will occur as indicated above.

After the CALEA surveillance is engaged, the TIAP 26 sends another LOCREQ to the HLR at 328 identifying B's mobile 14 as the terminating exchange. As stated above at 160, when the HLR receives the LOCREQ for B at 330, it sees that it is for a CALEA target, but the LOCREQ is coming from the MSC that is the non-serving Shriveling MSC for B. So the HLR proceeds with ordinary call delivery steps for B, which may include some CALEA interaction that is prior art.

The HLR 24 then sends a ROUTREQ to the serving MSC 22 using B's MIN or other suitable identifier, at 332. The serving MSC allocates a TLDN for the mobile and sends it back to the HLR in the router rr at 334. The HLR 24 receives the TLDN from the Serving MSC 22, and sends it back to the TIAP 26 in a lucre rr at 336. The TIAP 26 sets up a call leg to the serving MSC 22 by sending an ISUP Initial Address Message (IAM) at 338.

If the B does not answer their mobile 12, the call can be redirected to voicemail. As would be appreciated by those skilled in the art, the serving MSC 22 will send a Redirection Request to the TIAP, since from the standpoint of the Serving MSC, the TIAP has originated this call. The redirection to voicemail can then be handled by the TIAP 26, that is the Shriveling MSC, in a known manner. This call handling can also include known some CALEA interaction for shriveling the voicemail message.

This system 10 and method 100 is useful to any LEA with surveillance targets in a network that allows the LRQ to come from any MSC. Such network architecture is common in telecommunications networks located outside of the USA.

This system 10 and method 100 have been described within the context of an ANSI-41 network, but as mentioned, it could also be used in GSM/UMTS networks using MAP protocols. In GSM/UMTS networks, the names of the messages and parameters would be as follows. In place of the ANSI-41 Location Request (LOCREQ) a GSM/UMTS MAP SendRoutingInformation (SRI) can be used. In place of the ANSI-41 TLDN, a GSM/UMTS MAP MSRN can be used. In place of the ANSI-41 Routing Request (router rr) a GSM/UMTS MAP Provide Roaming Number can be used.

The system 10 and method 100 for shriveling call terminations made to B's mobile 14 meet the constraints of CALEA which include the requirement that information about surveillance may not be shared over public interfaces.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of forcing the path of call terminations for a roaming surveillance target mobile through a predetermined Target Intercept Access Point (TIAP) for surveillance in a wireless telecommunications network, the method comprising:

provisioning the target mobile's Home Location Register (HLR) with a TIAP identifier;

determining that a Location Request Query (LRQ) sent by a Location Requesting MSC (LRMSC) to the target mobile's HLR does not come from the TIAP;

determining that the target mobile is not registered at the TIAP;

allocating a Temporary Roaming Routing Number (TRRN) at the TIAP and noting it as being used for surveillance of the target;

establishing a call leg between the LRMSC and the TIAP;

establishing a surveillance configuration for surveilling the call termination;

sending a LRQ from the TIAP to the target mobile's HLR;

determining that the LRQ sent from the TIAP is for a surveillance target mobile;

determining that the LRQ sent from the TIAP is coming from an MSC that is a non-serving TIAP for the target; and establishing a call leg between the TIAP and the MSC serving the target mobile.

2. The method defined in claim 1 wherein the surveillance is a Communications Assistance for Law Enforcement Act (CALEA) surveillance.

3. The method defined in claim 1 wherein the TIAP is a Mobile Switching Center.

4. The method defined in claim 1 wherein the step of provisioning the target mobile's HLR with a TIAP identifier does not use a public interface.

5. The method defined in claim 1 wherein the wireless telecommunications network is an ANSI-41 network.

6. The method defined in claim 5 wherein the step of allocating a TRRN at the TIAP includes allocating a Temporary Local Directory Number.

7. The method defined in claim 5 wherein the LRQs are ANSI-41 LocationRequest Invoke messages.

8. The method defined in claim 5 wherein the steps of establishing call legs include sending ISUP Initial Address Messages.

9. The method defined in claim 1 wherein the wireless telecommunications network is a Global System for Mobile Communications (GSM) network or a Universal Mobile Telephone System (UMTS) network using Mobile Application Part (MAP) protocols.

10. The method defined in claim 9 wherein the step of allocating a TRRN at the TIAP includes allocating a Mobile Station Roaming Number (MSRN).

11. The method defined in claim 9 wherein the LRQs are MAP Send Routing Information (SRI) messages.

12. The method defined in claim 9 wherein the steps of establishing call legs include sending ISUP Initial Address Messages.

13. The method defined in claim 1 wherein the LRQ for the target mobile does not come from the same MSC for every call made to the target mobile in the network.

14. A system for forcing call terminations for a roaming surveillance target mobile through a predetermined Target Intercept Access Point (TIAP) for surveillance in a wireless telecommunications network comprising:

a Location Requesting Mobile Switching Center (LRMSC) sending a Location Request Query (LRQ) for obtaining routing information for the mobile call termination at the target's mobile;

a TIAP Mobile Switching Center for allocating a Temporary Roaming Routing Number (TRRN) and noting that the TRRN is being used for surveillance of the target mobile; and a Home Location Register (HLR) for the target mobile provisioned with a TIAP Identifier uniquely identifying the TIAP in the network and surveillance information identifying the target mobile as a surveillance target, the HLR determining that a LRQ sent from the LRMSC is not from the TIAP and determining that a LRQ sent from the TIAP is for a surveillance target mobile sent from a non-serving TIAP for the target mobile.

15. The system defined in claim 14 wherein the HLR is provisioned with the TIAP identifier without using a public interface.

16. The system defined in claim 14 wherein the system uses ANSI-41 protocols, and the TRRN is an ANSI-41 Temporary Local Directory Number, and the LRQs are ANSI-41 LocationRequest Invoke messages.

17. The system defined in claim 14 wherein the system uses Mobile Application Part (MAP) protocols and the TRRN is a MAP Mobile Station Roaming Number (MSRN), and the LRQs are MAP Send Routing Information (SRI) messages.

18. A method for surveilling a roaming surveillance target mobile in a wireless telecommunications network wherein Location Request Queries (LRQs) for the target mobile can be sent from any MSC in the network, the method comprising:

provisioning the target mobile Home Location Register (HLR) with a Target Intercept Access Point (TIAP) identifier uniquely identifying the TIAP;

determining that an LRQ sent by a Location Requesting MSC (LRMSC) to the target mobile's HLR does not come from the TIAP;

determining that the target mobile is not registered at the TIAP;

determining that an LRQ sent from the TIAP is for a surveillance target mobile;

determining that the LRQ sent from the TIAP is coming from an MSC that is a non-serving TIAP for the target; and forcing call terminations for the roaming surveillance target mobile through TIAP for surveillance.

* * * * *